Nov. 4, 1930.  H. M. PURSEL  1,780,401
POWER OPERATED SCRAPER
Filed Dec. 23, 1929   2 Sheets-Sheet 1
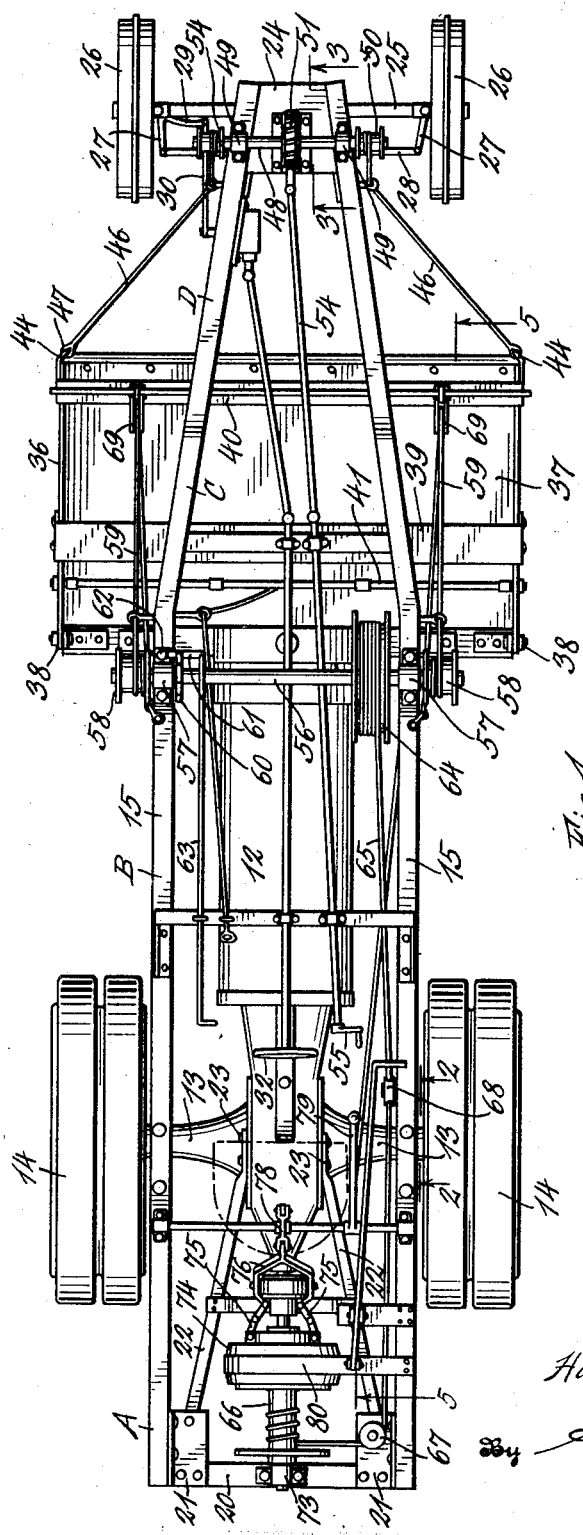
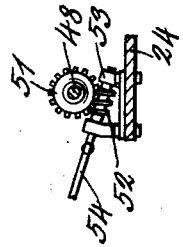
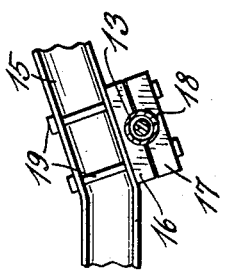
Inventor
Harold M. Pursel.
By A. J. O'Brien
Attorney Nov. 4, 1930.  H. M. PURSEL  1,780,401
POWER OPERATED SCRAPER
Filed Dec. 23, 1929    2 Sheets-Sheet 2
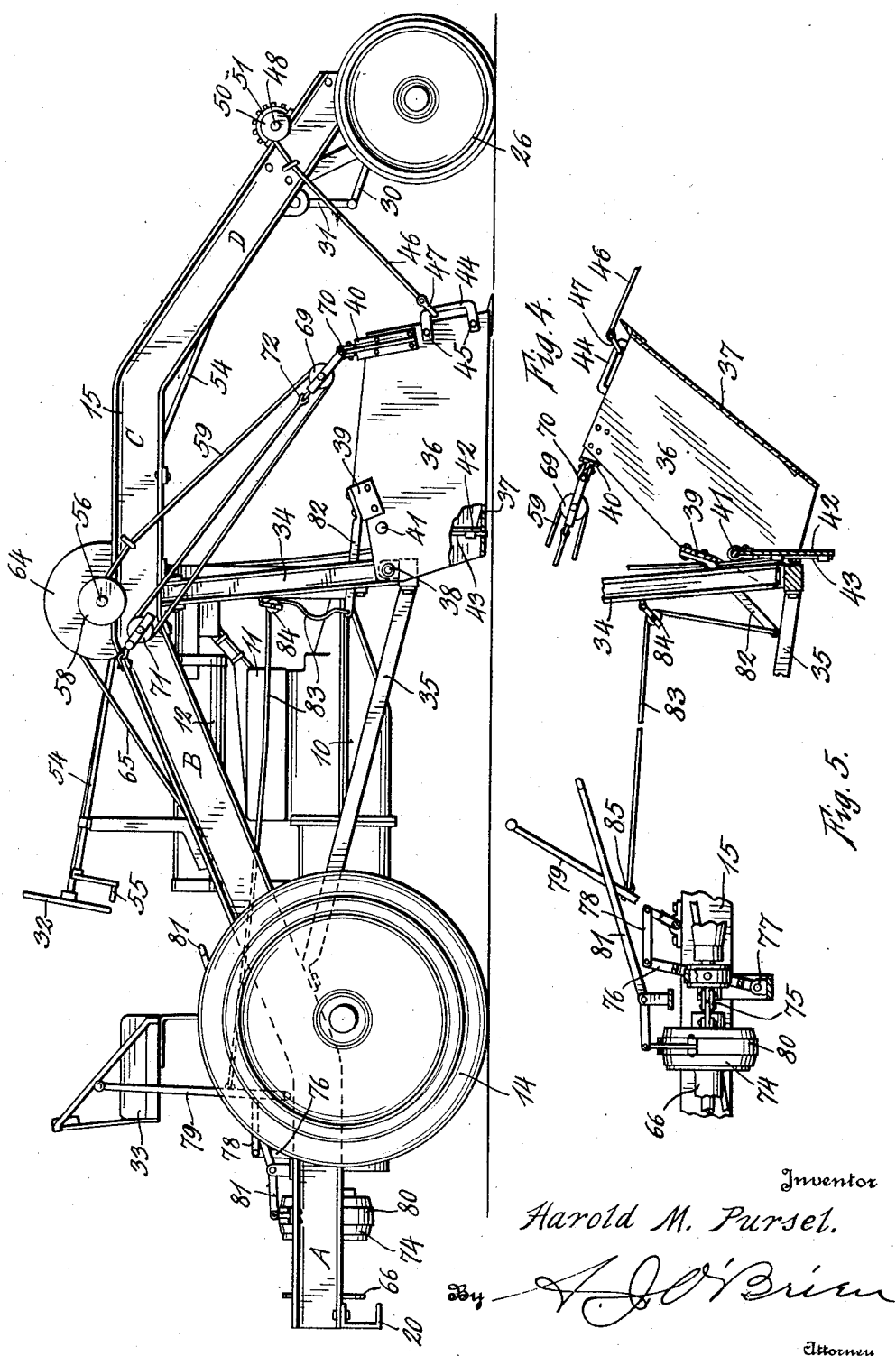
Inventor
Harold M. Pursel.
By
Attorney Patented Nov. 4, 1930

1,780,401

UNITED STATES PATENT OFFICE

HAROLD M. PURSEL, OF CASPER, WYOMING, ASSIGNOR TO SHARROCK AND PURSEL, OF CASPER, WYOMING, A COPARTNERSHIP CONSISTING OF W. G. SHARROCK AND HAROLD M. PURSEL

POWER-OPERATED SCRAPER

Application filed December 23, 1929. Serial No. 415,928.

This invention relates to improvements in power operated scrapers of the type described and claimed in my copending application Serial No. 351,138, filed March 30, 1929, now Patent No. 1,750,126, and in U. S. Letters Patent No. 1,735,412, granted to me on November 12, 1929.

In the construction of roads and in many other places where a large amount of dirt is to be moved power operated scrapers of different types are employed. Scrapers of this type are operated by means of a tractor of the type employed for farm use and which furnishes the power. The scraper is usually attached to the tractor so as to form a unitary structure with the latter.

In this invention a frame comprising two arched I-beams is connected with the tractor, one beam being located on each side of the tractor and properly secured to the latter. The front ends of the beams are inwardly inclined and attached to the front ends are the steering wheels by means of which the scraper is guided. A scraper is located underneath the beams in front of the tractor and is operated by means of a winch which, in turn, is operated by power derived from the tractor engine.

It is the object of this invention to produce a structure of great simplicity and of rugged construction that shall be suitable for the purpose under consideration and which owing to its construction can be manufactured at a comparatively small cost.

The above and other objects that may become apparent as the description proceeds are attained by means of a construction and an arrangement of parts that will now be described in detail, reference for this purpose being had to the accompany drawings in which the preferred embodiment of my invention has been illustrated, and in which:

Fig. 1 is a top plan view of my improved scraper;

Fig. 2 is a section taken on line 2—2, Fig. 1, and shows the manner in which the frame is secured to the axle housing of the tractor;

Fig. 3 is a section taken on line 3—3, Fig. 1;

Fig. 4 is a side elevation of my improved scraper, parts being broken away to better show the construction; and Fig. 5 is a diagrammatic view partly in section showing the position of the parts when the scraper is tilted.

In the drawing reference numeral 10 designates the crank case of the tractor and 11 the cylinder block thereof, while 12 designates the gasoline tank and 13 the rear axle with which the drive wheels 14 are connected. Since I employ a tractor of a standard make, it will not be described in detail, but the explanation thereof will be limited to such parts as cooperate in a specific manner with my attachment. The front wheels of the tractor are removed and are attached to the front end of the frame in a manner which will hereinafter be fully described. The frame consists of two I-beams or channels 15, one of which is located on each side of the tractor. These beams are of the same size and shape with the exception that one is a right and the other a left. Each beam consists of four straight portions which have been designated by letters A, B, C and D. These straight portions are related in the manner shown in Figs. 1 and 2. Secured to the under side of each beam near the intersection of portions A and B are two blocks 16 and 17. These blocks are provided at their centers with semi-circular depressions 18 which are adapted to receive the axle housing 13 and which are held in place by means of bolts 19 in the manner shown in Fig. 2. The rear ends of the beams are connected by means of a transverse beam 20 which is secured in place by means of angle brackets 21. Inclined brace rods 22 extend from the rear corners of the frame to the sides of the differential housing and are secured to the latter by means of bolts 23. Secured to the front ends of the beams is a plate 24 to the under side of which the front axle 25 is secured. The front wheels 26 are secured to the axle by the usual means employed in connection with tractors and automobiles. The wheel spindles are each provided with a rearwardly extending arm 27 and these are connected by means of a connecting rod 28. The spindle on the left side is provided with another spindle arm 29 to which the front end of link 30 is connected. The rear end of link 30 is pivotally attached to the free end of a rotating crank arm 31 that is oscillated by means of suitable worm gear mechanism, the worm of which is rotated by means of the hand wheel 32 that is located near the seat 33. By rotating the wheel 32, the direction in which the machine travels can be governed in a manner obvious from the drawing. Secured to the underside of each of the side frames is a downwardly extending I-beam or channel 34. The lower ends of these beams or channels are connected with the lower end of the straight sections B by means of brace rods 35 in the manner shown in Fig. 4. A scraper having sides 36 and a bottom 37 is pivotally attached at 38 to the lower ends of the beams 34. The upper edges of the sides are connected to each other by means of a flat bar 39 and a T-bar 40, which hold the sides against outward movement. A rod 41 extends between the two sides and serves as a pivot for the hinged end 42. This end member is held in closed position by means of latching members 43 which will not be described in detail as they have been shown and described in the patents above identified. Secured to the front end of each side of the scraper is a U-shaped member 44 that is held in place by rivets 45 and with which the cables 46 are connected by means of clevises 47. Rotatably secured to the front ends of the frame members 15 is a shaft 48. This shaft is journalled in bearings 49 and is provided at each end with a drum 50. Secured to the center of this shaft is a worm gear wheel 51 with which the worm 52 is operatively associated. The worm is journalled in bearings 53 and is rotated by means of a jointed rod 54 that terminates in a crank 55 located near the seat 33. The cables 47 are attached one to each drum 50 and by rotating the shaft 48 the depth to which the front end of the scraper can move is limited by these cables, which, however, permit the scraper to be tilted into the position shown in Fig. 5. A shaft 56 is rotatably mounted in bearings 57 secured to the upper flanges of the straight sections C of the beams 15. Secured to each end of shaft 56 is a drum 58 to which one end of a cable 59 is connected. A ratchet wheel 60 is secured to the shaft 56 and is adapted to be engaged by a pawl 61 that is pivoted at 62. This pawl can be moved into and out of operative position by means of a rod 63. A large drum 64 is secured to shaft 56 and a cable 65 has one end secured to this drum and is wound several times around the drum. This cable extends rearwardly and has its other end connected to the drum 66 of the winch that is operated by the engine of the tractor and which will hereinafter be more fully described. Cable 65 is guided by means of pulleys 67 and 68.

The cables 65 and 59 are wound around their drums in opposite directions so that any tension exerted on one of these cables is transmitted to the other. Cables 59 extend about pulleys 69 that are secured by means of clevises 70 to the flange of the bar 41 and thence extend rearwardly and about the pulleys 71 and have their ends connected at 72 with the frames in which pulleys 69 are mounted. Cables 59 together with pulleys 69 and 71 form a fall and tackle arrangement by means of which the power exerted by the cables 59 can be multiplied. When the cable 65 is unwound from drum 64, cables 59 will be wound onto drums 58 and will tilt the scraper from the position shown in Fig. 4 to that shown in Fig. 5.

The drive shaft of the engine extends rearwardly and has its rear end journaled in a bearing 73 secured to the transverse bar 20. Mounted on the drive shaft is the drum 66 and a friction clutch 74 which is of an ordinary construction and which will therefore not be described in detail. The friction clutch is operated by means of two sets of toggles 75 that are controlled by means of a yoke member 76 whose lower end is pivoted at 77 and whose upper end is connected by means of a link 78 to a control handle 79. When handle 79 is moved rearwardly, it makes the friction clutch operative and when it is moved forwardly to the position shown in Fig. 5, the friction clutch is released. A brake comprising a band 80 is used for controlling the rotation of the drum 66 and this brake is controlled by means of a handle 81.

A lever 82 is connected with the flat bar 39 of the scraper and one end of cable 83 is connected to the outer end of this lever. Cable 83 extends over a pulley 84 secured to the vertical bar 34 and has its other end connected at 85 with the lever 79 in the manner shown in Fig. 5. Cable 83 is of such length that when the scraper is in the position shown in Fig. 4, it has considerable slack so that the handle 79 can be moved rearwardly to the position shown in Fig. 4. When lever 79 is in the position shown in Fig. 4, the friction clutch is operatively connected and rotates the drum 66 and winds the cable 65 thereon. As cable 65 moves rearwardly it must unwind from drum 64 and this causes shaft 56 to rotate, thereby winding the cables 59 onto the drums 58 and tilting the scraper. When the scraper approaches the position shown in Fig. 5, the action of arm 82 serves to tension the cable 83 and to move lever 79 forwardly thereby releasing the clutch. When the clutch is released, the weight of the scraper and parts will be sufficient to rotate shaft 56 in the opposite direction but the downward movement of the scraper is controlled by means of the brake and it can therefore be let down gradually. When the scraper is moved from place to place, the pawl 61 is moved into engagement with one of the ratchet teeth and holds shaft 56 against rotation.

From the above description it will be seen that I have utilized the clutch 74 and the drum 66 with which tractors of this type are usually provided, for raising and lowering the scraper, thereby greatly simplifying the construction of the attachment. By means of the arm 82 and cable 83 the clutch is automatically moved to inoperative position as the scraper approaches the position shown in Fig. 5 and the scraper can be held in this position, either by the action of the brake, or, by means of the pawl 61.

From the above description it will be apparent that I have produced a power operated scraper of a simple and substantial construction that can be operated by means of power obtained from the engine of the tractor and which does not require a clutch mechanism, but which utilizes the clutch and winch of the tractor for tilting the scraper.

Having described the invention what is claimed as new is:

1. A power scraper employing a tractor having a winch, a friction clutch and a brake for controlling the winch, a frame secured to the tractor, said frame comprising two upwardly bowed beams, one secured to each side of the tractor, a bar secured to the under side of each beam and extending downwardly therefrom, a scraper pivoted to the lower ends of the bars, a shaft extending across the frame and having its ends rotatably supported in bearings carried by the beams, a drum secured to each end of the shaft, cables secured at one end to the drums and having their other ends attached to the front end of the scraper, a third drum secured to the shaft, and a cable having one end secured to the third drum and wound about the same, the other end of this cable being connected with the winch whereby when the cable is wound onto the winch it will be unwound from the drum on the shaft and rotate the latter whereby the front end of the scraper will be raised.

2. A power scraper employing a tractor having a winch, a friction clutch and a brake for controlling the winch, a frame secured to the tractor, said frame comprising two upwardly bowed beams, one secured to each side of the tractor, a bar secured to the under side of each beam and extending downwardly therefrom, a scraper pivoted to the lower ends of the bars, a shaft extending across the frame and having its ends rotatably supported in bearings carried by the beams, a drum secured to each end of the shaft, cables secured at one end to the drums and having their other ends attached to the front end of the scraper, a third drum secured to the shaft, a cable having one end secured to the third drum and wound about the same, the other end of this cable being connected with the winch whereby when the cable is wound onto the winch it will be unwound from the drum on the shaft and rotate the latter whereby the front end of the scraper will be raised, and means for automatically releasing the clutch when the scraper has been tilted.

3. A power scraper employing a tractor having a winch, a friction clutch and a brake for controlling the winch, a frame secured to the tractor, said frame comprising two upwardly bowed beams, one secured to each side of the tractor, a bar secured to the under side of each beam and extending downwardly therefrom, a scraper pivoted to the lower ends of the bars, a shaft extending across the frame and having its ends rotatably supported in bearings carried by the beams, a drum secured to each end of the shaft, cables secured at one end to the drums and having their other ends attached to the front end of the scraper, a third drum secured to the shaft, a cable having one end secured to the third drum and wound about the same, the other end of this cable being connected with the winch whereby when the cable is wound onto the winch it will be unwound from the drum on the shaft and rotate the latter whereby the front end of the scraper will be raised, a shaft extending transversely of the frame in front of the scraper, means for rotating the shaft, a drum secured to each end of the shaft, and a cable extending from each drum to the front end of the scraper.

4. A power scraper employing a tractor having a winch, a friction clutch and a brake for controlling the winch, a frame secured to the tractor, said frame comprising two upwardly bowed beams, one secured to each side of the tractor, a bar secured to the under side of each beam and extending downwardly therefrom, a scraper pivoted to the lower ends of the bars, a shaft extending across the frame and having its ends rotatably supported in bearings carried by the beams, a drum secured to each end of the shaft, cables secured at one end to the drums and having their other ends attached to the front end of the scraper, a third drum secured to the shaft, a cable having one end secured to the third drum and wound about the same, the other end of this cable being connected with the winch whereby when the cable is wound onto the winch it will be unwound from the drum on the shaft and rotate the latter whereby the front end of the scraper will be raised, a shaft extending transversely of the frame in front of the scraper, means for rotating the shaft, a drum secured to each end of the shaft, a cable extending from each drum to the front end of the scraper, and means for automatically releasing the clutch when the scraper has been tilted.

In testimony whereof I affix my signature.

HAROLD M. PURSEL.